United States Patent [19]

Smith

[11] 4,173,431
[45] Nov. 6, 1979

[54] ROAD VEHICLE-ACTUATED AIR COMPRESSOR AND SYSTEM THEREFOR

[75] Inventor: Roland L. Smith, Homestead, Fla.

[73] Assignee: Nu-Watt, Inc., Miami, Fla.

[21] Appl. No.: 869,780

[22] Filed: Jan. 16, 1978

Related U.S. Application Data

[63] Continuation-in-part of Ser. No. 814,685, Jul. 11, 1977, Pat. No. 4,115,034.

[51] Int. Cl.² .......................... F04B 9/02; F04B 35/00
[52] U.S. Cl. .................................. 417/229; 417/903; 417/534
[58] Field of Search ............... 417/229, 231, 233, 903, 417/534

[56] References Cited

U.S. PATENT DOCUMENTS

| | | | |
|---|---|---|---|
| 565,429 | 8/1896 | Chaquette | 417/229 |
| 1,600,352 | 9/1926 | Nagy | 417/229 X |
| 3,088,417 | 5/1963 | Johnston | 417/229 X |
| 3,688,859 | 9/1972 | Hudspeth | 417/233 X |
| 4,001,597 | 1/1977 | Graff | 417/229 X |
| 4,081,224 | 3/1978 | Krupp | 417/229 |

Primary Examiner—Richard E. Gluck
Attorney, Agent, or Firm—Oltman and Flynn

[57] ABSTRACT

A road vehicle-actuated air compressor and a system are disclosed for utilizing compressed air to operate an electrical generator to generate electricity. The road vehicle-actuated air compressor includes an actuator, a cylinder, and a piston in the cylinder reciprocatable in response to actuation of the actuator by a vehicle for compressing air in the cylinder. The cylinder is provided with a first vent means for introducing air into the cylinder behind the piston during a forward stroke of the piston, a valve-controlled second vent means for introducing air into the cylinder on the other side of the piston during the reverse stroke thereof, and outlet means for supplying air compressed by the piston during the forward stroke thereof to a utilization device. In the system for generating electricity, the air compressor is combined with an electricity generator operated by compressed air to generate electricity and at least one air storage unit coupled between the electricity generator and the outlet means of the cylinder for storing compressed air enroute to the generator. The air storage unit may be supplied with compressed air from other vehicle-actuated air compressors to provide a network for supplying compressed air to the air operated electricity generator.

1 Claim, 10 Drawing Figures

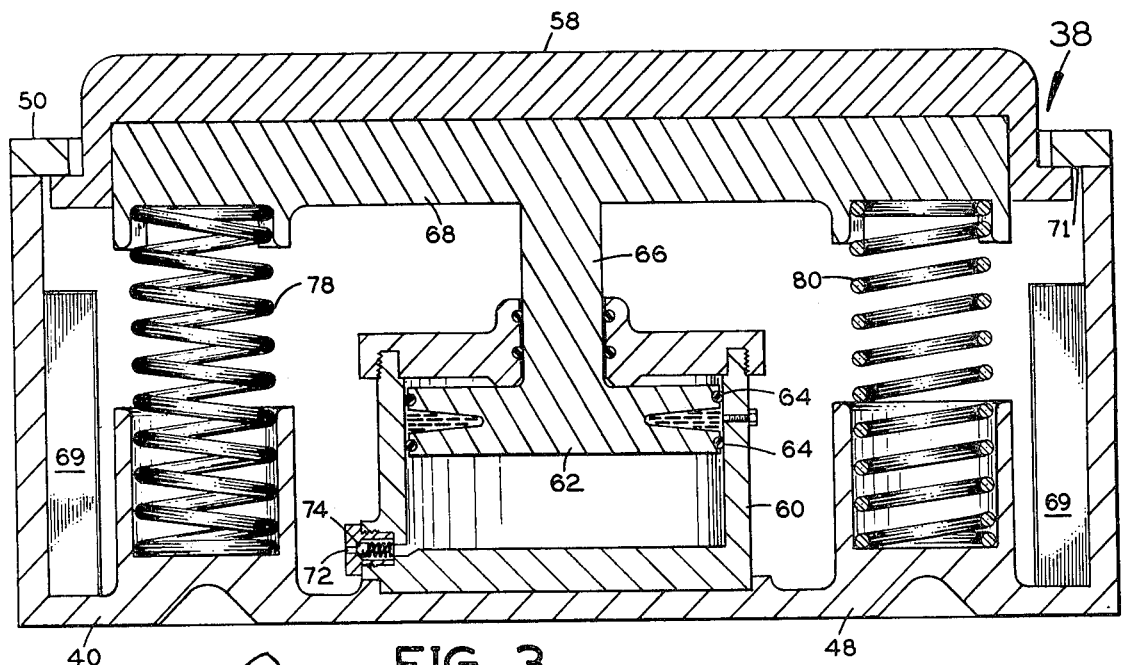
FIG. 3
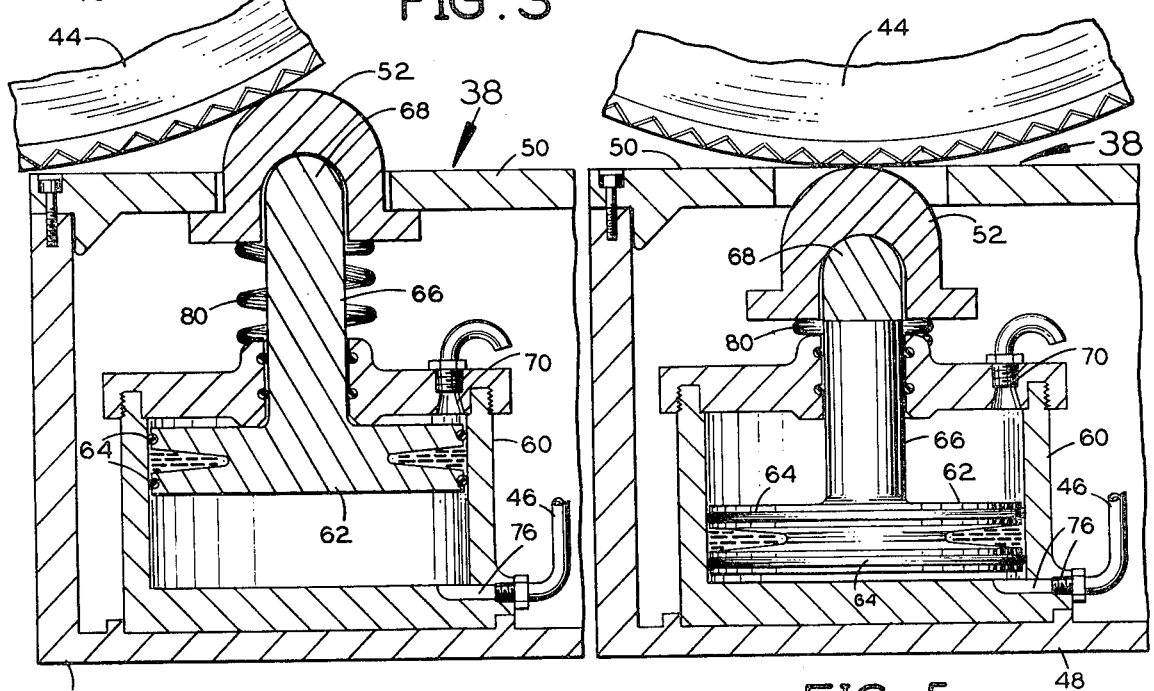
FIG. 4
FIG. 5
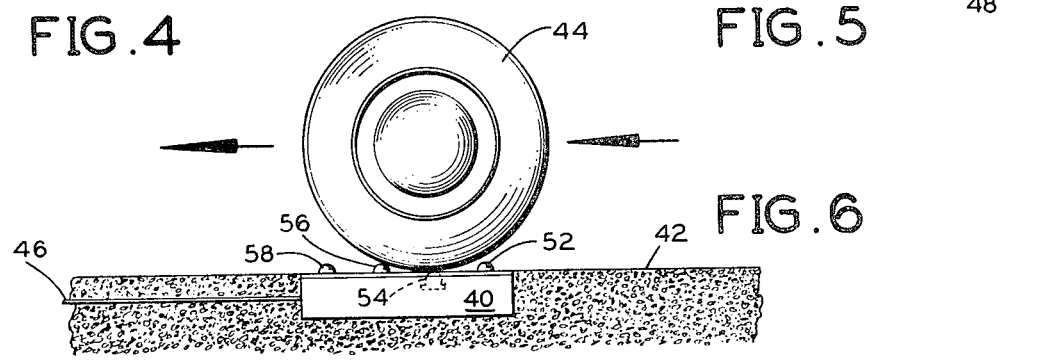
FIG. 6

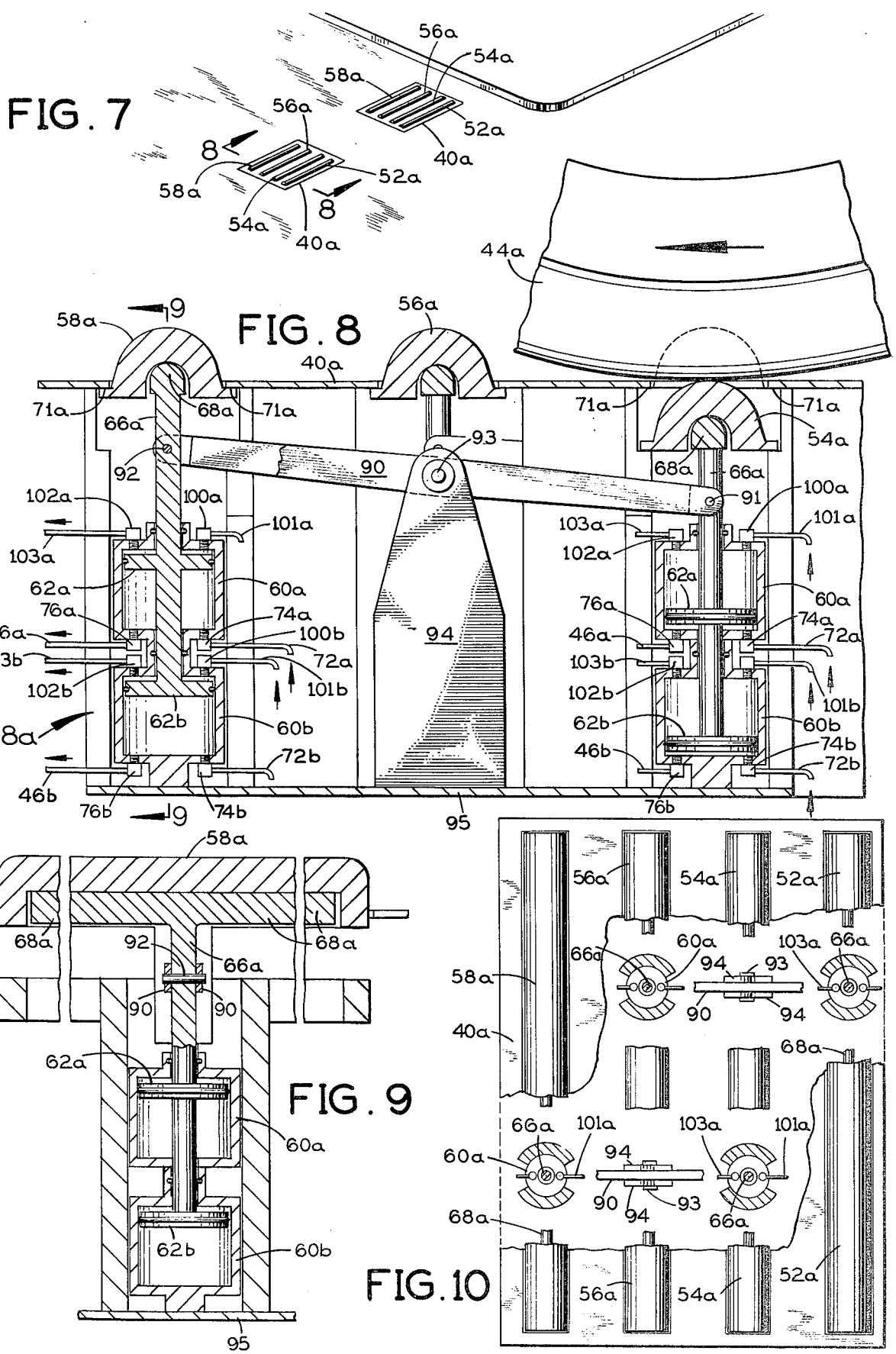

ROAD VEHICLE-ACTUATED AIR COMPRESSOR AND SYSTEM THEREFOR

CROSS-REFERENCE TO RELATED APPLICATION

This application is a continuation-in-part of my copending application, Ser. No. 814,685, filed July 11, 1977, now U.S. Pat. No. 4,115,034.

BACKGROUND OF THE INVENTION

At the present time, it appears that shortages of conventional forms of energy, particularly oil, have become critical. Much effort has been devoted to finding alternate sources of energy. Most energy sources suffer from drawbacks. Some are limited as to the amounts available, and when a particular material has been used it is gone forever. They are not available to all nations. Some have created ecological problems. It is not known how to handle some energy sources safely or dispose of their wastes safely. Most, with the exception of gravity, wind and water, are not forces by themselves. They can do nothing unless something is done to them.

SUMMARY OF THE INVENTION

The present invention is an attempt to harness gravity. Use is made of air and water as required.

To this end, the invention provides a system for compressing air by gravity-related forces and utilizing the compressed air to generate electrical energy. The system includes an electricity generator operated by compressed air and an air storage means operatively connected to the generator to supply compressed air to the generator for operating the same. An actuator is provided for actuation in response to motion of a road vehicle. A piston in a cylinder is movable in forward and reverse strokes in response to actuation of the actuator by the vehicle for compressing air in the cylinder. The cylinder is provided with a first vent means for introducing air into the cylinder behind the piston during a forward stroke thereof. A second valve-controlled vent means is provided for the cylinder for introducing air into the cylinder on the other side of the piston during the reverse stroke thereof. Outlet means for the cylinder supplies air compressed by the piston to the air storage means enroute to the electrical generator. Thus, gravity forces acting on the road vehicle are harnessed to compress air and the compressed air is utilized to generate electricity.

Accordingly, it is an object of the present invention to harness gravity forces for the generation of electricity utilizing compressed air as an intermediary.

Another object of the invention is to enable gravity forces acting on a road vehicle to operate a piston and cylinder device for compressing air which is ultimately supplied to an electrical generator operated by compressed air to generate electricity.

Another object of the invention is to provide a road vehicle-actuated air compressor in which a piston in a cylinder is reciprocated by the operation of an actuator in response to motion of the road vehicle to compress air in the cylinder which can be supplied to a utilization device.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 3 is a sectional view taken along the lines 3—3 of FIG. 2;

FIG. 4 is a sectional view taken along lines 4—4 of FIG. 2 and showing an actuator of an air compressor as it is about to be depressed by a wheel of a road vehicle;

FIG. 5 is a sectional view similar to FIG. 4 showing an actuator of an air compressor after it has been depressed by the wheel of the vehicle;

FIG. 6 is a cut-away view of a roadway showing a unit with multiple air compressors having actuators being depressed sequentially by a wheel of a moving vehicle;

FIG. 7 is a fragmentary perspective view showing a second embodiment of the present road vehicle-actuated compressor in the roadway;

FIG. 8 is a vertical longitudinal section taken along the line 8—8 in FIG. 7;

FIG. 9 is a vertical cross-section taken along the line 9—9 in FIG. 8; and

FIG. 10 is an enlarged top plan view of one of the roadway embedded units shown in FIG. 7, with parts broken away for clarity.

Figure 1:
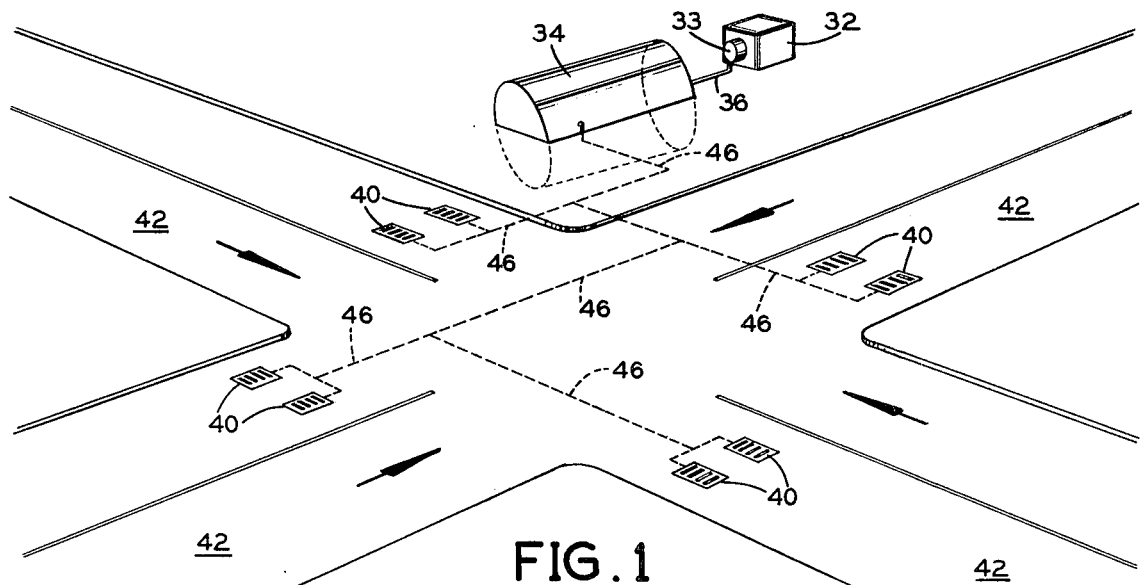
FIG. 1 is a schematic diagram of a system for generating electrical energy by the use of compressed air in accordance with one embodiment of the invention.

Before explaining the disclosed embodiments of the present invention in detail, it is to be understood that the invention is not limited in its application to the details of the particular arrangements shown, since the invention is capable of other embodiments. Also the terminology used herein is for the purpose of description and not of limitation.

DETAILED DESCRIPTION

Referring first to FIGS. 1 through 6, there is shown a vehicle-actuated system for compressing air and thereby generating electrical energy. The system includes an electricity generator 32 (FIG. 1) which is turned by a compressed air motor 33 to generate electricity. Compressed air motors suitable for driving a generator are available commercially.

An air storage tank 34 is connected by a line 36 to the generator 32 for supplying compressed air to the generator for operating it. There may be more than one tank in the system if desired.

The compressed air is supplied by road vehicle-actuated air compressors 38 which are contained in compressor units 40 that are embedded in roadways 42. In the system shown in FIG. 1, two compressor units 40 are mounted in the left hand lane of each roadway 42 near an intersection so that when a car or truck crosses the intersections, its wheels will pass over the units 40. FIG. 6 shows a wheel 44 of an automotive vehicle passing over one of the compressor units 40 which, as shown, is recessed in the roadway 42. The compressor units 40 are connected by air lines 46 (FIG. 1) to the storage tank 34 for supplying the compressed air to the storage tank.

Figure 2:
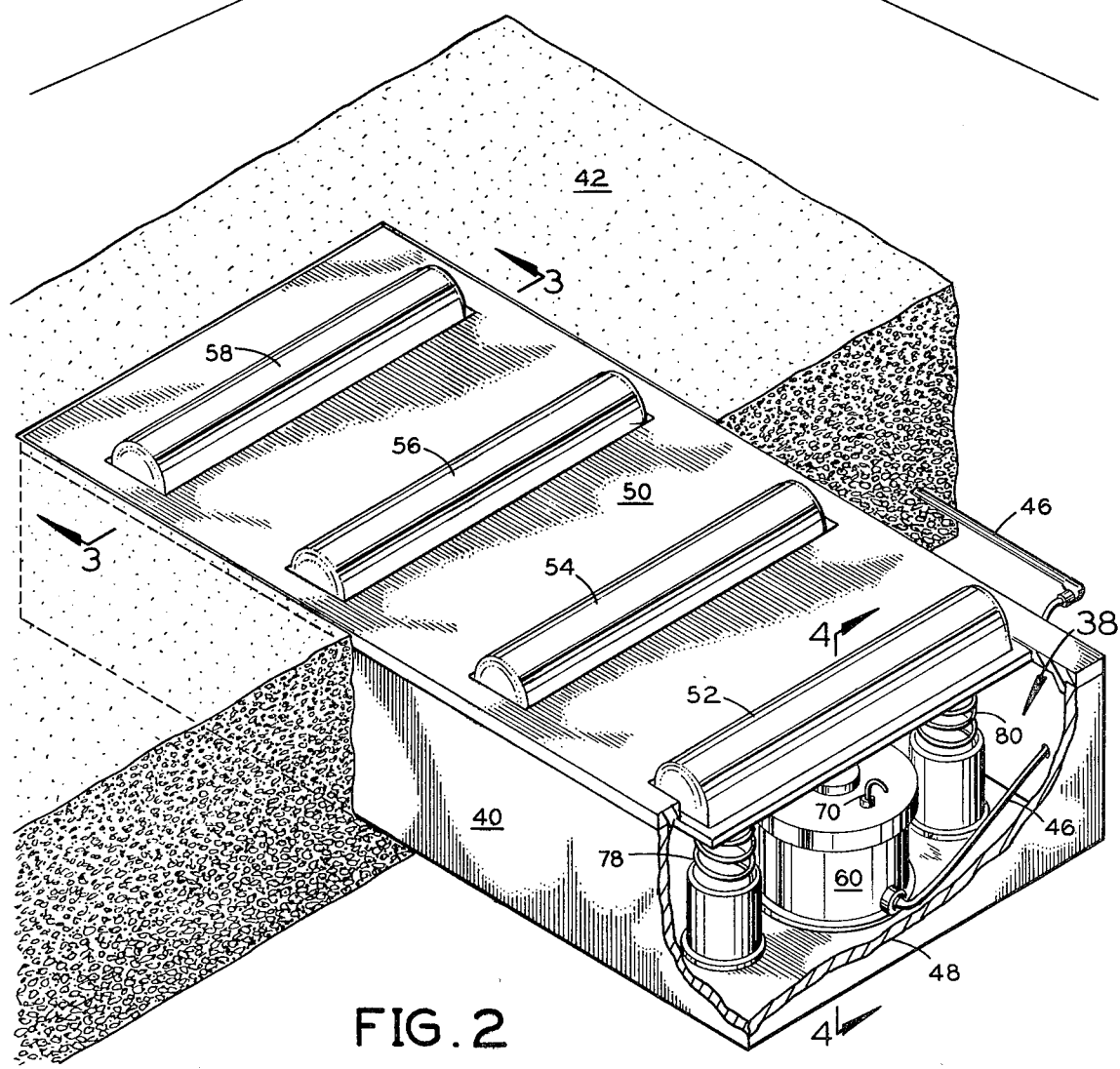
FIG. 2 is a perspective view of a road vehicle-actuated air compressor included in the system of FIG. 1.

Each compressor unit 40 includes a box-like housing 48 having a top 50 from which four movable actuators 52, 54, 56 and 58 project, as best seen in FIG. 2. When the wheel 44 passes over the unit 40, the actuators 52, 54, 56 and 58 are depressed sequentially.

Each actuator is part of a vehicle actuated compressor 38 which is shown more fully in FIGS. 3, 4 and 5. Within the box 48, there is a cylinder 60, and a piston 62 inside the cylinder. The piston 62 is reciprocatable inside the cylinder 60, and it is appropriately sealed relative to the walls of the cylinder as with o-rings 64. The piston 62 has a plunger 66 which is connected loosely to the respective actuator 52, 54, 56 or 58, as with a nested, floating rod 68. Thus, the piston is movable in forward and reverse strokes in the cylinder in response to actuation of the actuator by a vehicle for compressing air in the cylinder. Stops 69 and 71 limit the movement of the actuator and rod 68.

There is a first vent 70 (FIGS. 4 and 5) communicating with the upper side of the piston for introducing air into the cylinder behind the piston during a forward stroke of the piston. There is also a second valve-controlled vent 72 for the cylinder communicating with the lower side of the piston for introducing air into the cylinder on the other side of the piston during a reverse stroke thereof. The vent 72 may be controlled by a spring-biased ball-check valve 74.

A valve-controlled outlet 76 communicates with the lower side of the piston and is connected with the line 46 for supplying air compressed by the piston during the forward stroke thereof to the air storage tank 34.

In operation, when the wheel 44 passes over the actuator in the manner illustrated in the FIGS. 4 and 5, both the actuator and the piston 62 are sharply depressed to compress air at the lower side of the piston, and this air is supplied through the line 46 to the air storage tank. After the wheel 44 passes over the actuator both the actuator and the piston 62 are returned to the upper rest position by springs 78 and 80 which extend between the lower wall of the housing 48 and the actuator.

The outlet 76 may include a ball-check valve (not shown) similar to the ball-check valve 74 but reversed relative thereto for allowing compressed air to escape from the cylinder 60, but not allowing the compressed air to return into the cylinder during the reverse stroke of the piston 62.

FIGS. 7-10 show a second, presently-preferred embodiment of the invention in which elements which correspond to those in the embodiment of FIGS. 1-6 are given the same reference numerals, with an "a" or "b" suffix added. The detailed description of these corresponding elements will not be repeated.

The actuators in FIG. 7 are arranged in pairs, with the two actuators 52a-56a or 54a-58a of each pair mechanically coupled to each other so that when one is up the other is down, and vice versa.

Referring to FIG. 8, the paired actuators 54a and 58a, have their respective plungers 66a interconnected by a rigid linkage arm 90 which has bifurcated opposite ends pivotally connected to these plungers at 91 and 92. Midway along its length the linkage arm 90 is pivotally supported at 93 on the upper end of a pair of rigid support plates 94 extending up from the horizontal bottom wall 95 of the housing 48a. With this arrangement, when the actuator 54a is forced down by the road vehicle tire 44a passing over it, the linkage arm 90 moves the other actuator 58a of this pair to its uppermost position engaging its limit stops 71a, as shown in FIG. 8. Conversely, when the other actuator 58a of this pair is forced down by the vehicle tire, the linkage arm 90 moves the actuator 54a up against its limit stops 71a.

The relative positions of the actuators 54a and 58a in the roadway for normal (i.e., forwardly moving) traffic is such that the actuator 54a will be depressed by a vehicle tire before the actuator 58a.

Each plunger 66a is connected to upper and lower pistons 62a and 62b, which are vertically reciprocable in upper and lower cylinders 60a and 60b, respectively.

The two cylinders below each actuator 54a or 58a have respective inlet check valves 100a and 100b at the top connected to the atmosphere by air inlets 101a and 101b, respectively. When the respective pistons 62a and 62b in these cylinders move down, the inlet check valves 100a and 100b admit air at atmospheric pressure into the upper ends of the cylinders. During the upstroke of these pistons, the inlet check valves 100a and 100b remain closed.

Below each actuator 54a or 58a the upper cylinder 60a is provided with an outlet check valve 102a at the top leading to an outlet line 103a. Similarly, the lower cylinder 60b below this actuator is provided with an outlet check valve 102b at the top leading to an outlet line 103b. Both outlet check valves 102a and 102b open in the upstroke of the respective pistons and remain closed during their downstroke.

Below each actuator 54a or 58a both cylinders are provided at the bottom with air inlets, 72a and 72b, respectively, and inlet check valves 74a and 74b which function in the same manner as the check valve 74 in FIG. 3, that is, to insure that the cylinder pressure below the respective piston 62a or 62b does not drop significantly below atmospheric pressure, by opening in the upstroke of that piston. These inlet check valves remain closed during the downstroke of these pistons.

Below each actuator 54a or 58a, the upper cylinder 60a is provided with an outlet check valve 76a at the bottom leading to an outlet line 46a. Similarly, the lower cylinder 60b below this actuator has an outlet check valve 76b leading to an outlet line 46b. Both check valves 76a and 76b open in the downstroke of the respective pistons 62a and 62b to pass pressurized air to their respective output lines 46a and 46b.

The upper outlet lines 103a, 103b and the lower outlet lines 46a, 46b for the respective cylinders below each actuator are all connected to an air storage tank (not shown).

In the operation of this apparatus, in the downstroke of the first actuator 54a, as shown in FIG. 8, pressurized air is expelled to the outlet lines 46a and 46b through the outlet check valves 76a and 76b at the lower ends of the cylinders below this actuator. The downward movement of the first actuator 54a causes the second actuator 58a to move up, due to the pivoted linkage arm 90 acting between them. Air above the pistons in the respective cylinders 60a and 60b below the second actuator 58a is discharged through the respective outlet check valves 102a and 102b to the outlet lines 103a and 103b.

Next, the second actuator 58a of this pair will be pushed down by the vehicle tire 44a in its continued forward movement. This causes pressurized air to be expelled from the cylinders below this actuator through their respective outlet check valves 76a and 76b to the respective outlet lines 46a and 46b.

This downward movement of the second actuator 58a causes the first actuator 54a to move up, due to the pivoted linkage arm 90 acting between them. The upward movement of the pistons 62a and 62b in the upper and lower cylinders 60a and 60b below the first actuator 54a causes pressurized air to be expelled from these cylinders through the respective outlet check valves 102a and 102b at the top to the respective outlet lines 103a and 103b.

It is to be understood that the piston rods below the other pair of actuators 52a and 56a are similarly interconnected by a pivoted linkage arm 90 for operation in the manner just described with reference to the paired actuators 54a and 58a.

With these arrangements, no return springs are required for biasing the actuators upward.

If desired, the cylinders below the paired actuators may be connected by air lines to provide a two-stage operation, with the outlet lines from the cylinders below the first actuator of the pair being connected to the inlet valve of either or both cylinders below the second actuator.

I claim:

1. A road vehicle-actuated system for compressing air and thereby generating electrical energy comprising:

an electricity generator operated by compressed air to generate electricity;

air storage means operatively connected to said generator to supply compressed air to said generator for operating the same;

first nested floating bar actuator means positioned in a roadway for actuation downward in response to motion of a vehicle along the roadway; said actuator means having a plunger nested in a floating bar projecting into the roadway;

a first pair of cylinders;

a first pair of pistons having down and up strokes in said cylinders respectively and coupled to said plunger of said actuator means for movement thereby;

vent means including an inlet check valve at the top of each of said cylinders above said pistons for introducing air into said cylinders above said pistons;

valve-controlled vent means at the bottom of each of said cylinders for introducing air into said cylinders below said pistons during an up stroke thereof; and valve-controlled outlet means at the bottom and top of said each of said cylinders for supplying air compressed by said pistons during a down stroke and up stroke thereof to said air storage means enroute to said electricity generator;

a second nested floating bar actuator means positioned in said roadway past said first-mentioned actuator means along a pre-determined path of vehicle travel along the roadway for downward actuation by the vehicle; said second actuator means having a plunger nested in a floating bar projecting into the roadway;

a second pair of cylinders;

a second pair of pistons having down and up strokes in said second cylinders and coupled to said plunger of said second actuator means for movement thereby;

vent means including an inlet check valve at the top of each of said second cylinders above said second pistons for introducing air into said second cylinders above said second pistons during a down stroke of said second pistons;

valve-controlled vent means at the bottom of each of said second cylinders for introducing air into said second cylinders below said second pistons during an up stroke thereof;

valve-controlled outlet means at the bottom of each of said second cylinder for supplying air compressed by said second pistons during a down stroke thereof to said air storage means enroute to said electricity generator;

valve-controlled outlet means at the top of each of said second cylinders for supplying air compressed by said second pistons during an up stroke thereof to said air storage means enroute to said electricity generator;

and mechanical linkage means acting between said plungers for causing upward movement of either pair of pistons in response to downward actuation of the other pair of pistons;

said system further including third and fourth nested floating bar actuator means and third and fourth pairs of cylinders and pistons having the same construction as said first and second pairs thereof and each provided with inlet vent means and valve-controlled outlet means and linkage means as recited herein with said third actuator means located between said first and second actuator means and said fourth actuator means located beyond said second actuator means in said path of travel.

* * * * *